(12) United States Patent
Hootman

(10) Patent No.: US 6,532,899 B1
(45) Date of Patent: Mar. 18, 2003

(54) CLIMBING AND SUNNING PLATFORM FOR TURTLES AND OTHER REPTILES AND AMPHIBIANS

(75) Inventor: Scott D. Hootman, San Leandro, CA (US)

(73) Assignee: Novalek, Inc., Hayward, CA (US)

( * ) Notice: Subject to any disclaimer, the term of this patent is extended or adjusted under 35 U.S.C. 154(b) by 0 days.

(21) Appl. No.: 10/059,977

(22) Filed: Jan. 30, 2002

(51) Int. Cl.[7] ............................................... A01K 63/00
(52) U.S. Cl. ..................... 119/253; 119/246; 119/705
(58) Field of Search ................................. 119/253, 246, 119/247, 248, 417, 422, 702, 705

(56) References Cited

U.S. PATENT DOCUMENTS

| | | | | |
|---|---|---|---|---|
| 3,141,442 A | * | 7/1964 | Harris | 119/246 |
| 3,699,921 A | * | 10/1972 | Janicek | 119/246 |
| 3,804,064 A | * | 4/1974 | Kuneman et al. | 119/246 |
| 4,261,294 A | * | 4/1981 | Bescherer | 119/57.8 |
| 4,361,116 A | * | 11/1982 | Kilham | 119/51.01 |
| 4,497,279 A | * | 2/1985 | Bell | 119/706 |
| 4,671,210 A | * | 6/1987 | Robinson et al. | 119/51.12 |
| 4,708,089 A | * | 11/1987 | Goldman et al. | 119/248 |
| 4,820,556 A | * | 4/1989 | Goldman et al. | 119/253 |
| 5,003,921 A | * | 4/1991 | Tracy | 119/257 |
| 5,121,709 A | * | 6/1992 | Wechsler | 119/246 |
| 5,135,400 A | * | 8/1992 | Ramey | 119/246 |
| 5,575,236 A | * | 11/1996 | Pogue et al. | 119/250 |
| 5,832,876 A | * | 11/1998 | Brown et al. | 119/256 |
| 5,862,541 A | * | 1/1999 | Mailhot | 119/221 |
| 6,029,605 A | * | 2/2000 | Licata | 119/246 |
| 6,123,047 A | * | 9/2000 | Sakai | 119/417 |
| 6,155,207 A | * | 12/2000 | LaRocca | 119/706 |
| 6,314,910 B1 | * | 11/2001 | Tracy | 119/230 |
| 6,327,997 B1 | * | 12/2001 | Terry et al. | 119/246 |

* cited by examiner

Primary Examiner—Yvonne Abbott
(74) Attorney, Agent, or Firm—Harris Zimmerman

(57) ABSTRACT

An aquarium accessory allows captive amphibious animals such as turtles, salamanders and frogs to follow their instinct to sun themselves in a location which provides quick access to the safety of the water. An upper platform stage is supported by an upper ramp which inclines upward from an edge of a lower platform stage. An inclined lower ramp extends downward into the water from the same edge of the lower platform stage to enable the animals to climb out of the water. The accessory attaches to a wall of the aquarium. Upward facing surfaces of the platform stages and ramps are coated with high traction material. The configuration of the accessory minimizes obstruction of the body of water in the aquarium.

9 Claims, 2 Drawing Sheets

CLIMBING AND SUNNING PLATFORM FOR TURTLES AND OTHER REPTILES AND AMPHIBIANS

BACKGROUND OF THE INVENTION

This invention relates to aquarium accessories and more particularly to a sunning platform for turtles or other amphibious animals which are confined in an aquarium.

Amphibious animals, such as turtles, salamanders and frogs, are air breathing animals which spend time in a body of water but also leave the water temporarily for various purposes.

Many species of turtle, for example, live primarily in the water while emerging for periods in order to rest and sun themselves. The turtle requires a sloped surface at the edge of the water in order to climb out of the water. The sunning area should be adjacent to the water to enable quick re-immersion if the animal feels threatened.

Establishing these conditions within the limited space of most aquariums presents problems. Providing an elevated flat area above the water line by using mounded granular material such as sand or with solid objects such as flat rocks obstructs a sizable portion of the body of water in the aquarium. A desirably compact slope formed in this manner may not provide sufficient traction for the animal.

The present invention is directed to overcoming one or more of the problems discussed above.

BRIEF SUMMARY OF THE INVENTION

In one aspect, the present invention provides a sunning platform for enabling amphibious animals to leave a body of water and rest at a location which is adjacent to the body of water. The platform has a substantially horizontally extending lower platform stage and a substantially horizontally extending upper platform stage. An inclined lower ramp extends downward from the lower stage to enable amphibious animals to climb out of the water. An inclined upper ramp extends upward from the lower stage to the upper stage.

In another aspect of the invention, the sunning platform includes a platform supporting flange for attachment to a wall of an aquarium. The flange extends vertically from a horizontal edge of the lower platform stage.

In another aspect of the invention, a sunning platform for amphibious animals which are confined in an aquarium includes a substantially horizontally extending lower platform stage and an inclined lower ramp extending outward and downward from an edge of the lower platform stage. An inclined upper ramp at one side of lower ramp extends outward and upward from the same edge of the lower platform stage. An upper platform stage extends from the upper ramp. The platform stages and ramps are rigidly joined together to form a unitary platform structure.

In still another aspect of the invention, layers of high traction material are secured to the upward facing surfaces of the platform stages and ramps, the high traction material being one which has a higher coefficient of friction than the material of which the platform stages and ramps are formed.

The invention allows turtles or other captive amphibious animals to climb out of the water in an aquarium or the like and sun themselves at a location which enables a quick return to the safety of the water. The platform can be compact, is easily installed and is easily cleaned. The configuration of the platform minimizes obstruction of the body of water in an aquarium for the purpose of providing a sunning area.

The invention, together with further objects and advantages thereof, may be further understood by reference to the following detailed description of the invention and by reference to the accompanying drawings.

DETAILED DESCRIPTION OF THE INVENTION

Figure 1:
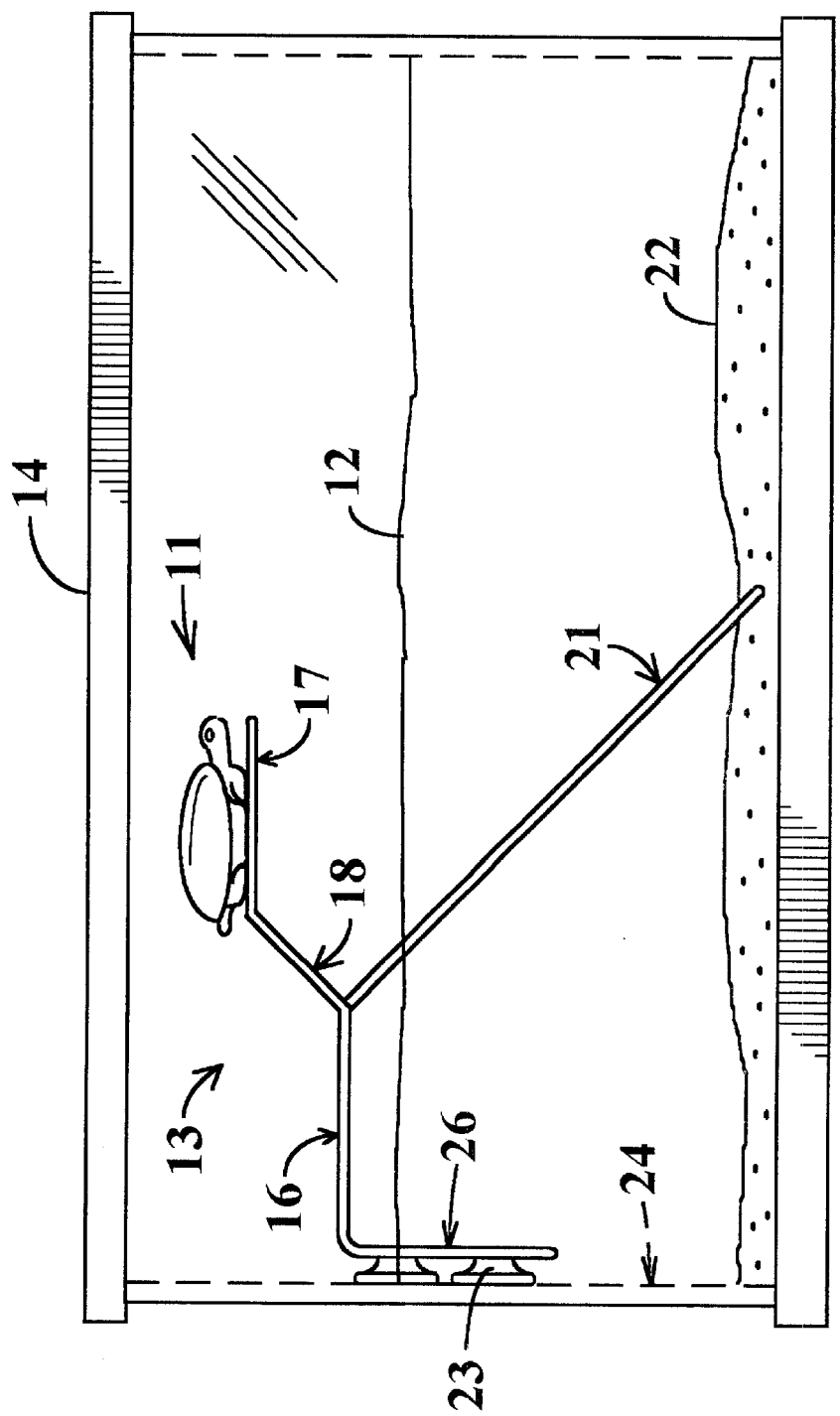
FIG. 1 is a side elevation view of a sunning platform embodying the invention shown installed in a pet aquarium.

Referring initially to FIG. 1 of the drawings, the natural instincts of many water dwelling amphibious animals such as turtles 11 impel them to climb out of the body of water 12 in order to sun themselves or to rest or for other purposes. This requires access to a sloped surface which extends out o the water and which leads to a more or less horizontal area suitable for resting. Preferably the resting area should be at a location which enables a quick return to the water by diving if the animal feels threatened. A sunning platform 13 in accordance with the present invention establishes these conditions within the confines of an aquarium tank 14 or the like.

Figure 2:
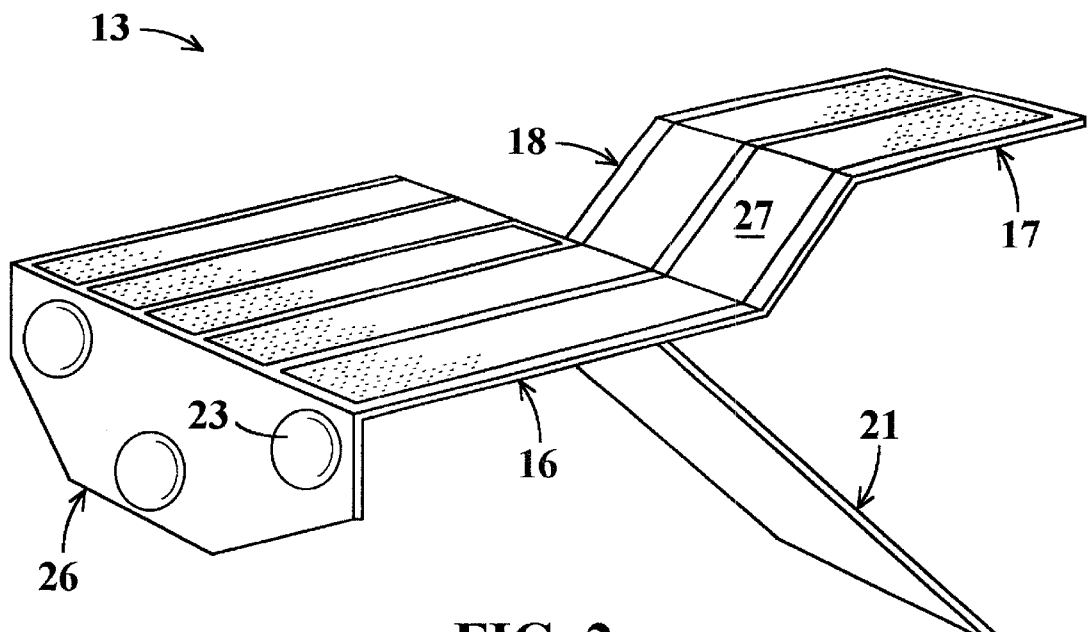
FIG. 2 is a perspective view of the sunning platform of FIG. 1 shown removed from the aquarium.
Figure 3:
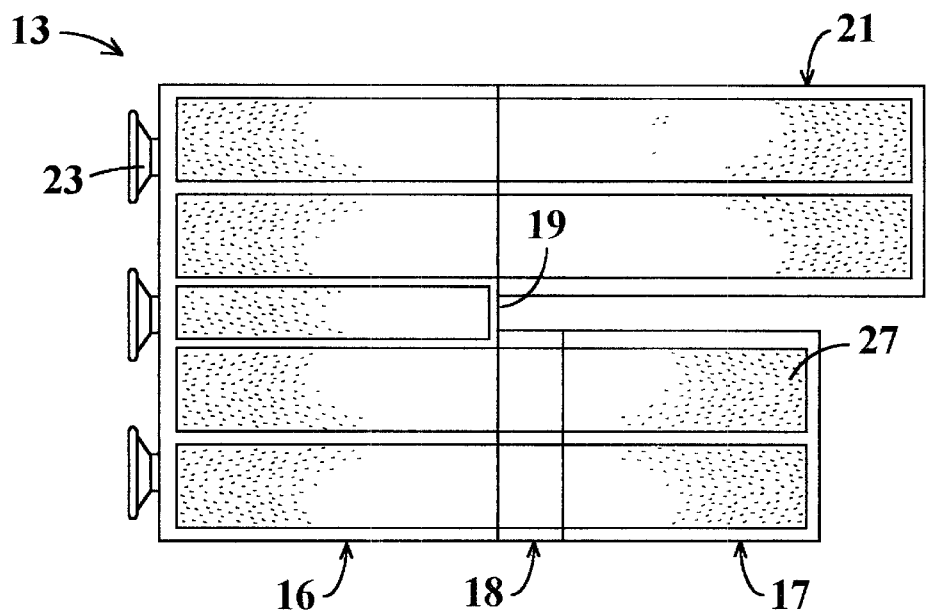
FIG. 3 is a top view of the sunning platform of the preceding figures.

Referring jointly to FIGS. 1, 2 and 3, the sunning platform 13 has a horizontally extending lower platform stage 16 and a smaller horizontally extending upper platform stage 17 which is vertically and laterally spaced from the lower stage. An inclined upper ramp 18 extends upward from an edge 19 of lower platform stage 16 to the upper platform stage 17. An inclined lower ramp 21, located to one side of the upper ramp 18, extends downward from the same edge 19 of the lower stage.

The platform stages 16, 17 and ramps 18, 21 are preferably each of rectangular shape and are components of a single rigid structure. The sunning platform 13 is proportioned to enable the lower platform stage 16 to be located a small distance above the surface of the body of water 12 in the aquarium 14 while the lower ramp 21 extends downward to the layer 22 of sand, gravel or other granular material that is customarily provided on the floor of the aquarium.

The above described sunning platform 13 configuration locates the upper platform stage 17, which may be a resting area that is preferred by the amphibious animal 11, over a region of the body of water 12 that is unobstructed by the lower ramp 21. Thus the amphibious animal 11 may quickly dive back into the water.

Upper ramp 18 and upper platform stage 17 are preferably spaced apart in the lateral direction from the lower ramp 21 as best seen in FIG. 3. Thus the amphibious animal's ascent up the lower ramp 21 is not impeded by the adjacent portions of the sunning platform.

Referring again to FIGS. 1, 2 and 3 in conjunction, the sunning platform 13 is supported by suction cups 23 which attach to a vertical wall 24 of the aquarium tank 14. The suction cups 23, of which there are three in this example, are secured to a flange 26 portion of the sunning platform 13 that extends downward from the edge of lower platform stage 16 that is opposite from the ramps 18 and 21.

The sunning platform 13 can be more compact and less obstructive of the body of water 12 in a small aquarium if the ramps 18 and 21 are inclined to the extent that is possible while remaining climbable by the amphibious animal 11 without difficulty. Ramp inclination can be increased by substantially covering the upward facing surfaces of upper and lower ramps 18 and 21 with layers 27 of high traction material which are adhered to the underlying material. Preferably the upper surfaces of platform stages 16 and 17 are also covered with the layers 27 of high traction material to provide more secure footing for the animal. High traction material for this purpose is one which has a coefficient of friction that is greater than the coefficient of friction of the material of which the surfaces are formed. For example, in this particular embodiment the platform stages 16 and ramps 18 and 21 are formed of acrylic plastic and layers 27 are rubber. The ramps 18 and 21 in this particular example are inclined at a 45° angle although other inclinations are also suitable.

Other aspects of the above described sunning platform configuration also contribute to compactness and minimal obstruction of the body of water in an aquarium. These include disposition of the upper and lower ramps 18 and 21 in a side by side relationship at the same edge of the lower platform stage 16. This locates the upper platform stage 17 over an open portion of the body of water 12 that is unobstructed by other parts of the structure. Thus the amphibious animal 11 may quickly dive back into the water without having to avoid submerged portions of the sunning platform. Attachment of the sunning platform 13 to a wall 24 of the aquarium 14 further minimizes obstruction of the underlying water. The sunning platform 13 has no tight crevices or recesses and is therefore easily cleanable.

While the invention has been described with reference to a particular embodiment for purposes of example, many modifications and variations are possible and it is not intended to limit the invention except as defined by the following claims.

What is claimed is:

1. A sunning platform for disposition in an aquarium which contains a body of water and for enabling amphibious animals to leave the body of water and rest at a location which is above the body of water, said platform having a substantially horizontally extending lower platform stage and a substantially horizontally extending upper platform stage which is at higher location than the lower platform stage, the sunning platform further having an inclined lower ramp extending downward from said lower platform stage to enable amphibious animals to climb out of the water and an inclined upper ramp extending upward from said lower platform stage to said upper platform stage, said lower platform stage being selectively attachable to a wall of said aquarium, said upper platform stage being attached only to said upper ramp and having an unobstructed top surface off of which an animal may dive in any of a plurality of different directions.

2. The sunning platform of claim 1 wherein said upper and lower platform stages and said upper and lower ramps are joined together and form a single rigid structure.

3. The sunning platform of claim 1 wherein said upper platform stage is positioned to extend over a region of said body of water that is unobstructed by said lower platform stage and unobstructed by said lower ramp.

4. The sunning platform of claim 1 wherein said upper and lower ramps are disposed in side by side relationship and extend from the same edge of said lower platform stage.

5. The sunning platform of claim 1 further including a platform supporting flange for attachment to a vertical wall of an aquarium which flange extends vertically from said lower platform stage at a first edge of the lower platform stage that is opposite from a second edge of the lower platform stage to which said lower ramp is attached.

6. The sunning platform of claim 5 wherein said flange extends downward from said first horizontal edge of said lower platform stage.

7. The sunning platform of claim 5 further including at least one suction cup secured to said flange in position to attach said flange to said aquarium wall.

8. The sunning platform of claim 1 wherein said upper and lower platform stages and said upper and lower ramps are rigidly joined components of a unitary platform structure, wherein said upper and lower ramps are disposed in side by side relationship and extend from the same edge of said lower ramp, said upper platform stage being supported by said upper ramp, and wherein said lower ramp is longer than said upper ramp.

9. A sunning platform for disposition in an aquarium which contains a body of water and for enabling amphibious animals to leave the body of water and rest at a location which is above the body of water, comprising a substantially horizontally extending lower platform stage adapted for selective attachment to a wall of said aquarium, an inclined lower ramp extending outward and downward from an edge of said lower platform stage, an inclined upper ramp located at one side of said lower ramp and extending outward and upward from said edge of said lower platform stage, an upper platform stage extending substantially horizontally from an upper end of said upper ramp, said platform stages and said ramps being rigidly joined together to form a unitary platform structure, said upper platform stage being attached only to said upper ramp and having an unobstructed top surface off of which an animal may dive in any of a plurality of different directions.

* * * * *